DIGITAL SYNCHRONIZER

Filed May 22, 1964 4 Sheets-Sheet 1

INVENTOR.
DAVID T. ELLIS
WILLIAM G. DALY
Russell, Chittick & Pfund

INVENTOR.
DAVID T. ELLIS
WILLIAM G. DALY

Russell, Chittick & Pfund

INVENTOR.
DAVID T. ELLIS
WILLIAM G. DALY
Russell, Chittick & Pfund

INVENTOR.
DAVID T. ELLIS
WILLIAM G. DALY

Russell, Chittick & Pfund

United States Patent Office 3,402,264

Patented Sept. 17, 1968

3,402,264

DIGITAL SYNCHRONIZER

David T. Ellis, Holliston, and William G. Daly, Lexington, Mass., assignors to Honeywell Inc., Minneapolis, Minn., a corporation of Delaware Filed May 22, 1964, Ser. No. 369,540

9 Claims. (Cl. 178—69.5)

ABSTRACT OF THE DISCLOSURE

A data strobe pulse generator generates strobe pulses spaced by the binary data bit interval by counting a predetermined number of high frequency pulses corresponding to the binary bit interval. A set of possible pulse correction times is generated which occupies a first portion of the binary bit interval after each data transition. The predetermined number count is used to produce an asymmetrical control wave which separates the possible pulse correction times into two equal parts, plus or minus one pulse, when the data strobe is located in the middle of the data bit interval. By using the correction control signal to add counts corresponding to the possible pulse correction times during the first part of the correction control signal and subtracting counts during the later part, a correction in the data strobe pulse position corresponding to the net count correction is made and the magnitude of the correction is proportional to the time error of the data strobe relative to the center of the data bit interval.

This invention relates generally to digital data communication systems and more particularly to improved digital synchronizing arrangements for such systems wherein local synchronizing signals are derived directly from the binary data.

Digital synchronizers have been provided in the past and are recognized as having advantages over the corresponding analogue type synchronizers in being free of the usual analogue type errors, and that the resolution of the digital systems can be refined to any desired point depending upon the basic pulse resolution which the system employs. Further advantages of such systems are found in the compatibility of the logic circuits with the remainder of the data processing system with which such data transmission arrangements are employed. The general features and arrangements for digital synchronizers are exemplified by the U.S. Patent to Roiz, No. 3,102,164, and the U.S. Patent to Schramel, et al., No. 3,112,363.

The present invention features a digital synchronizing system in which a proportional control is achieved by a programmed addition of extra pulses or deletion of regular pulses in a counter by control circuits which adjust the break-point between addition and deletion of the pulses relative to a data transition, so that a data strobe is generated at the midpoint of the bit interval which is substantially free of jitter. The actual position of the generated data strobe when the system is synchronized may oscillate about the desired center point of the bit interval, but by virtue of the digital resolution available, this deviation from the desired position for the strobe can be made as small as desired.

It is accordingly the primary object of the present invention to provide a digital self-synchronizing communications system in which synchronization is achieved by means of a proportional correction of the position of the data strobe pulse.

A further object of the invention is to provide a digital synchronizing system in which the circuits are arranged to add and delete pulses which are accurately positioned between pulses in the normal pulse train, thereby avoiding ambiguity due to overlap of adjacent pulses.

A further object of the invention is to provide a digital communication system in which synchronizing corrections at a receiving station are utilized in answering calls to the transmitter station, thereby providing the receiver at the transmitter station with data which incorporates any frequency drift of the synchronizing oscillator at the transmitting station.

Still another object is the provision of a communication system in which the receiver stations transmit answers in character phase with previous transmissions in order to be compatible with equipment which may not be capable of recognizing the start of successive code characters.

Another object is to provide a first data transition preset to provide initially correct phase for the generated synchronizing data strobe signal.

These and other objects of the invention will be apparent from the following detailed description taken in conjunction with the accompanying drawings, wherein.

Figure 1:
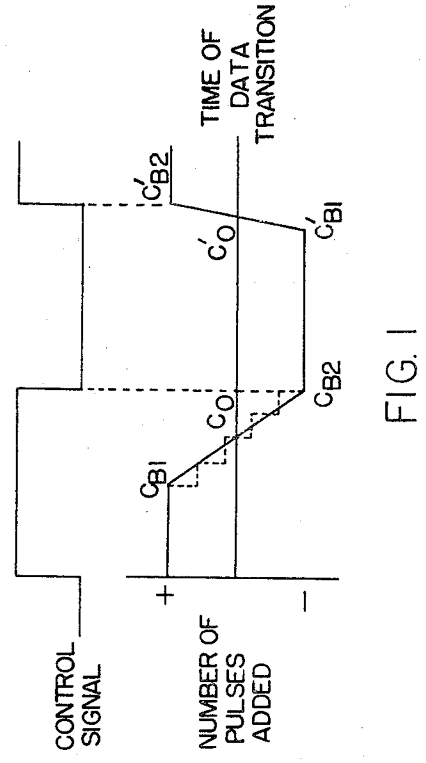
FIG. 1 is a timing diagram useful in describing the general theory of the proportional digital correction.

In the basic arrangement of the preferred embodiment of the invention, incremental pulses are added or subtracted, or both, for each data transition, in order to control the count of a counter relative to the data transition. Generation of the control signal which determines the addition or subtraction of pulses is obtained as hereinafter described to produce the desired proportional correction characteristic, as indicated in FIG. 1, which can be understood from the following considerations.

If the data transition occurs just prior to the time the control signal passes through its negative transition, a positive correction will result (adding pulses). Shortly after the commencement of the positive correction, the control signal will pass through its negative transition and the correction will change to a negative direction. Where the transition takes place determines the net number of pulses added to the counter, and, therefore, a range of proportional correction exists. A similar property exists just prior to the positive transition of the control signal.

By making the control signal asymmetrical, one can produce a symmetrical correction characteristic. A synchronization scheme having the characteristic shown in FIGURE 1 will lock on to the data having point $C_0$ positioned at the time of nominal data transitions. Data transitions occurring elsewhere will force the clock in a direction that will position $C_0$ nearer the data transition.

To describe the characteristics of such a synchronization system, suppose the control signal is generated from a counter having $C_m$ pulses for each cycle of the control signal. Also let:

$C_n$—count of counter when the control signal passes through a negative transition.

$C_p$—count of counter when the control signal passes through a positive transition.

$C_{B1}'$, $C_{B2}$, $C_O$, $C_{B1}$, $C_{B2}'$, $C_O'$—the count in the counter at the points on the correction curve in FIGURE 1.

$C_d$—count of counter when a data transition occurs.

$C_s$—duration of allow correction in terms of the number of standard pulses it encompasses.

$\alpha$—the ratio of correction pulses to standard pulses.

The break point $C_{B1}$ will occur at a count of $$C_{B1}=c_n-(1+\alpha)C_s \qquad (1)$$

Break point $C_{B2}$ will always occur at $C_n$, i.e.

$$C_{B2}=C_n \qquad (2)$$

The number of pulses added to the counter when $C_{B1}<C_d<C_{B2}$ is given by Equation 3.

$$\text{Extra pulses added}=\frac{(C_n-C_d)\alpha}{1+\alpha}C_{B1}<C_d<C_{B2} \qquad (3)$$

These extra pulses will be added during a length of time (expressed in the number of standard pulse times)

$$(C_n-C_d)-\frac{(C_n-C_d)\alpha}{1+\alpha}\text{ leaving }C_s-\left[(C_n-C_d)\left(\frac{1}{1+\alpha}\right)\right]$$

times to remove pulses.

The number of pulses removed during the remainder of $C_s$ is given by Equation 4.

$$\text{Pulses removed}=\left\{C_s-\left[(C_n-C_d)\left(\frac{1}{1+\alpha}\right)\right]\right\}\alpha \qquad (4)$$

The net number of pulses added during the duration of allow correction will be the difference between Equation 3 and Equation 4.

$$P=(C_n-C_d)\left(\frac{2\alpha}{1+\alpha}\right)-C_s\alpha,\ C_{B1}<C_d<C_{B2}$$

The slope of Equation 5 describes the effective correction coefficient in the range between $C_{B1}$ and $C_{B2}$.

$$\frac{dp}{dC_d}=\frac{2\alpha}{1+\alpha}=m \qquad (6)$$

One further point of interest is $C_o$, the cross-overpoint. This is given by Equation 7.

$$C_o=C_n-\frac{1+\alpha}{2}C_s \qquad (7)$$

For a symmetrical correction curve, $C_o$ must be positioned in the middle of the curve. From Equation 7 a value of $C_n$ can be obtained.

$$C_n=C_o+\frac{1+\alpha}{2}C_s \qquad (8)$$

For the particular system described here $C_o=63$, $\alpha=1/16$, $C_s=64$, using these numbers $C_n$ becomes $$C_n=98$$

The correction curve in FIGURE 1 possesses a range of proportional phase correction between $C_{B1}$ and $C_{B2}$ which is a series of steps. These are shown with dashed lines. These steps become larger in number and smaller in magnitude as the total counts in the counter necessary for a complete cycle increases, while the value of $\alpha$ remains fixed. Thus, the resolution of the correction curve can be made extremely large by incorporating a large sized counter.

Figure 2:
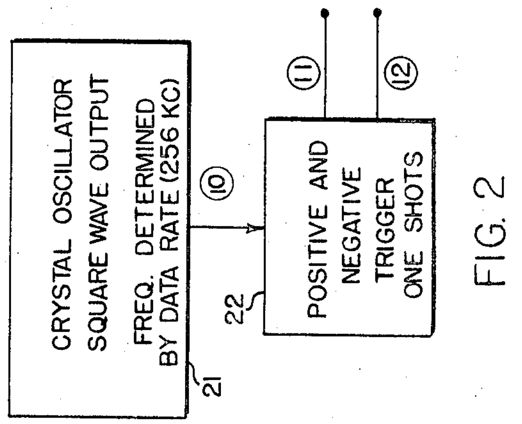
FIG. 2 is a block diagram of a stable crystal control oscillator and associated trigger circuit for use in a receiver station.

Referring now to FIG. 2, a block representative of a crystal controlled oscillator 21 is shown driving a pair of positive and negative trigger one shots 22. The crystal oscillator 21 is selected for generating in extremely stable frequency at a relatively high multiple of the data rate and for a particular embodiment with a data rate of 2,000 bits per second, a frequency of 256 kilocycles per second for the oscillator 21 will be satisfactory. The output of the oscillator 21 is waveform 10 in the form of a square wave at the frequency of the oscillator 21. Throughout the drawings the waveforms are identified by a numeral enclosed in a circle. The negative going transitions of the waveform 10 trigger a negative one-shot circuit in the block 22 to produce one microsecond pulses of waveform 11 as the basic counting pulse train for the control system. The positive going transitions of the waveform

10 trigger a positive one shot in the block 22 to produce the wave train 12 at the output thereof which pulses are utilized as the source of the pulses added to the basic counting wave train of waveform 11 whenever additional pulse counts are required. The wave trains 11 and 12 as the outputs of the positive and negative trigger one shots 22 are used at various points in the system which are operating at the basic frequency of the crystal controlled oscillator 21. The application of these wave trains for the control and actuation of the various counters will be understood by those skilled in the art.

Figure 3:
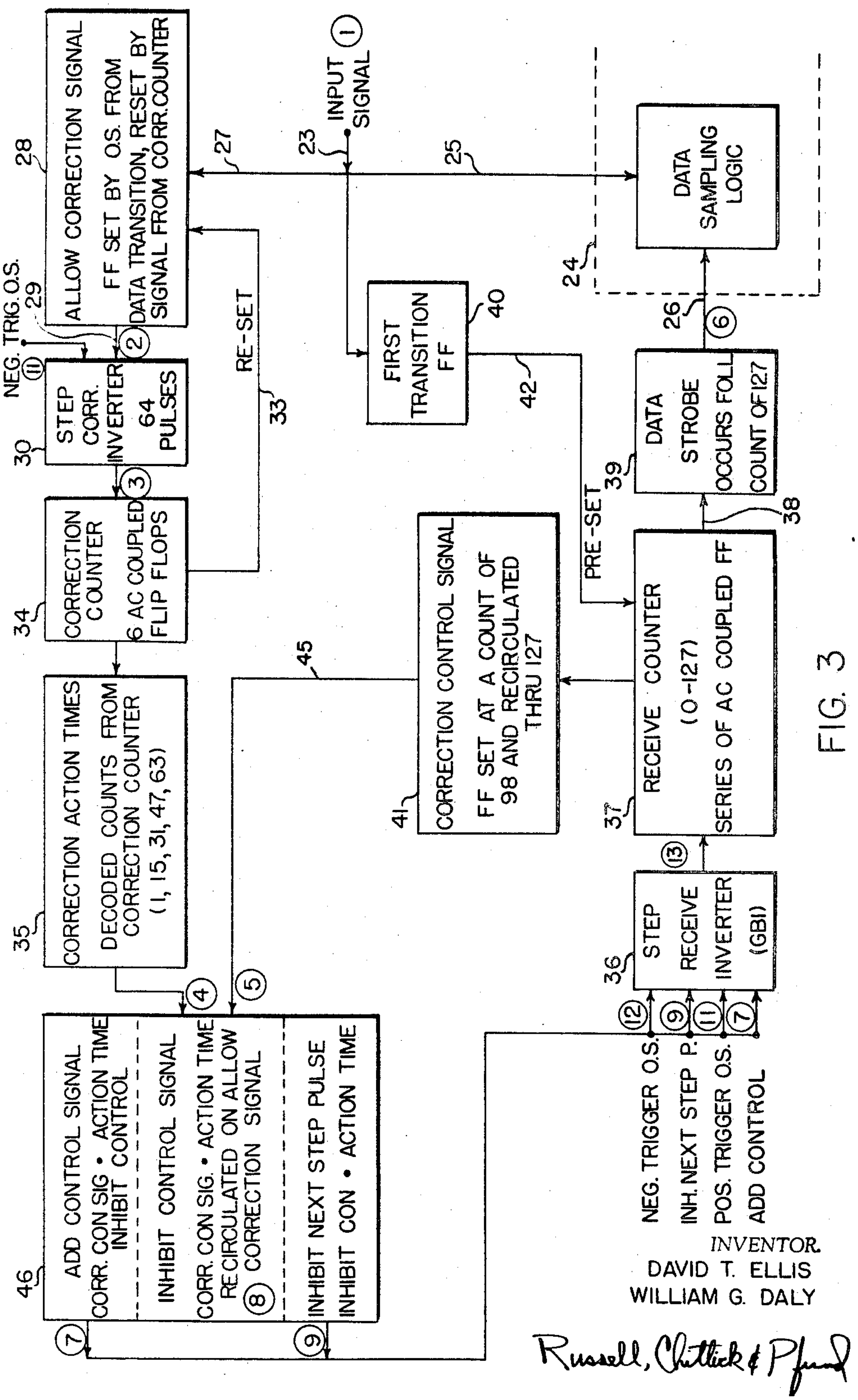
FIG. 3 is a block diagram of the general arrangement at a receiver station for providing proportional digital control of the generation of the data strobe pulse.

Referring now to FIG. 3, in conjunction with the waveform diagrams of FIGS. 4 and 5, the control loop for the generation for the data strobe will be described. On input line 23 the basic binary data signal waveform 1 is applied in the form of a DC square wave. This data signal is decoded in the data processor 24 by means of an input on line 25 with the decoding taking place under the control of the data strobe pulse waveform 6 which is applied on line 26 to the data processor 24. The generation of the waveform 6 to occur midway between data transitions of the data signal waveform 1 irrespective of jitter and other variations on the data signal is the primary objective of the present invention.

The data waveform 1 on line 23 is also applied on line 27 to a flip-flop 28 which is set by each data transition. When set, the flip-flop 28 applies on output line 29 an allow correction waveform 2 which enables an inverter 30 to pass the negative trigger one-shot pulses from waveform 11 to a correction counter 34 which produces a reset pulse on line 33 after counting sixty-four such pulses. The reset signal on line 33 resets the flip-flop 28 which inhibits the inverter 30. The sixty-four pulses of waveform 3 which are counted in a correction counter 34 are connected to a decoding circuit 35 for determining correction action times 4. The decoder 35 produces waveform 4 which has a plurality of spaced correction action times located at pulse positions 1, 15, 31, 47, and 63, of the sixty-four pulse burst signal 3 which passes through step correction counter 34.

For developing a correction control signal 5, a step receiver signal inverter 36 passes selected positive and negative trigger one-shot pulses of wave trains 11 and 12 to a receive counter 37 under the control of waveforms 7 and 9 as hereinafter described. The output of the step receive inverter 36 is waveform 13 which constitutes the actual pulse train for operating a receive counter 37. The receive counter 37 has a series of AC coupled flip-flop stages for counting from 0 through 127 before producing an output pulse on line 38, and this output 38 operates data probe 39 to produce data strobe pulse 6 on output lead 26 where it is utilized in the data processor 24 as previously described.

The correction control signal 5 is derived in a flip-flop 41 which is set by the count of 98 from the receive counter 37 and recirculated through the count of 127. Thus output lead 45 has waveform 5 thereon comprising an asymmetrical wave which has one state for the counts 0 through 98 of the receive counter 37 and the opposite state for the count of 98 through 127.

The waveforms 4 and 5 are utilized by unit 46 to generate the waveforms 7, 8 and 9. The waveform 8, which is the inhibit control signal, is generated as indicated by the AND combination of the correction control signal (waveform 5) and the action times (waveform 4), and recirculated during the allow correction signal of waveform 2. The duration of the inhibit control 8 extends until the end of the allow correction wave 2.

The add control waveform 7 is generated in the unit 46 by the AND combination of $\overline{\text{correction control signal}}$ (wave 5 negation) action time (wave 4), and $\overline{\text{inhibit control}}$ (wave 8 negation). Thus the add control pulses 7 are generated from the action time spaced pulses of waveform 4 occurring inside the 0 to 98 count of the correction control signals 5 and of $\overline{\text{inhibit control signal}}$ 8.

The unit 46 generates an inhibit next step pulse waveform 9 by the AND combination of inhibit control signal 8 and action time 4, in combination with the next two pulses of waveform 12 to assert and negate the wave 9 thereby bracketing the next pulse of wave 13.

For obtaining a fast initial synchronization, a circuit to recognize the first data transition of any message may be used to preset the receive counter 37 to the midpoint of its count, thereby assuring a data strobe generation approximately one-half a bit interval after the first data transition. This is implemented in FIG. 3 by a first transition flip-flop 40 which has input data transitions from line 23 applied to set the flop and is recirculated until the end of the message. The output of flip-flop 40 on line 42 is applied to a preset input on the counter 37 to preset the count to sixty-four. Thus a data strobe appears on line 38, sixty-four counts after the first data transition.

Figure 4:
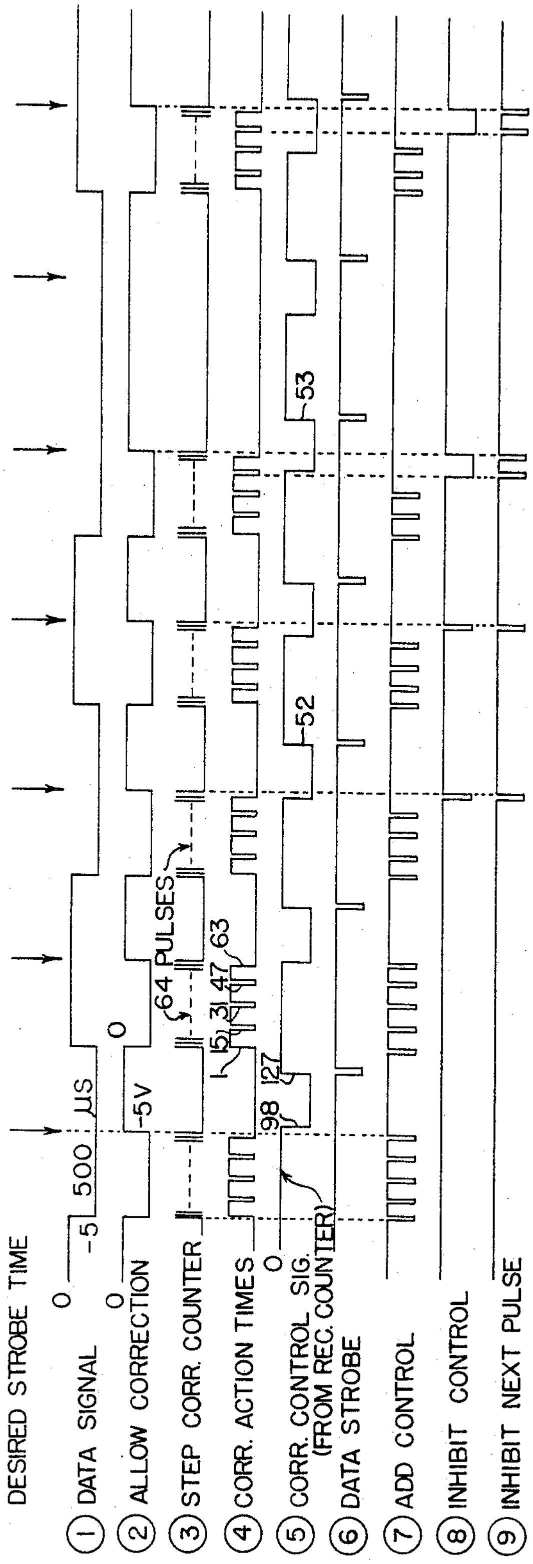
FIG. 4 is a series of wave forms related to the time scale of the binary data signal.
Figures 5A, 5B:
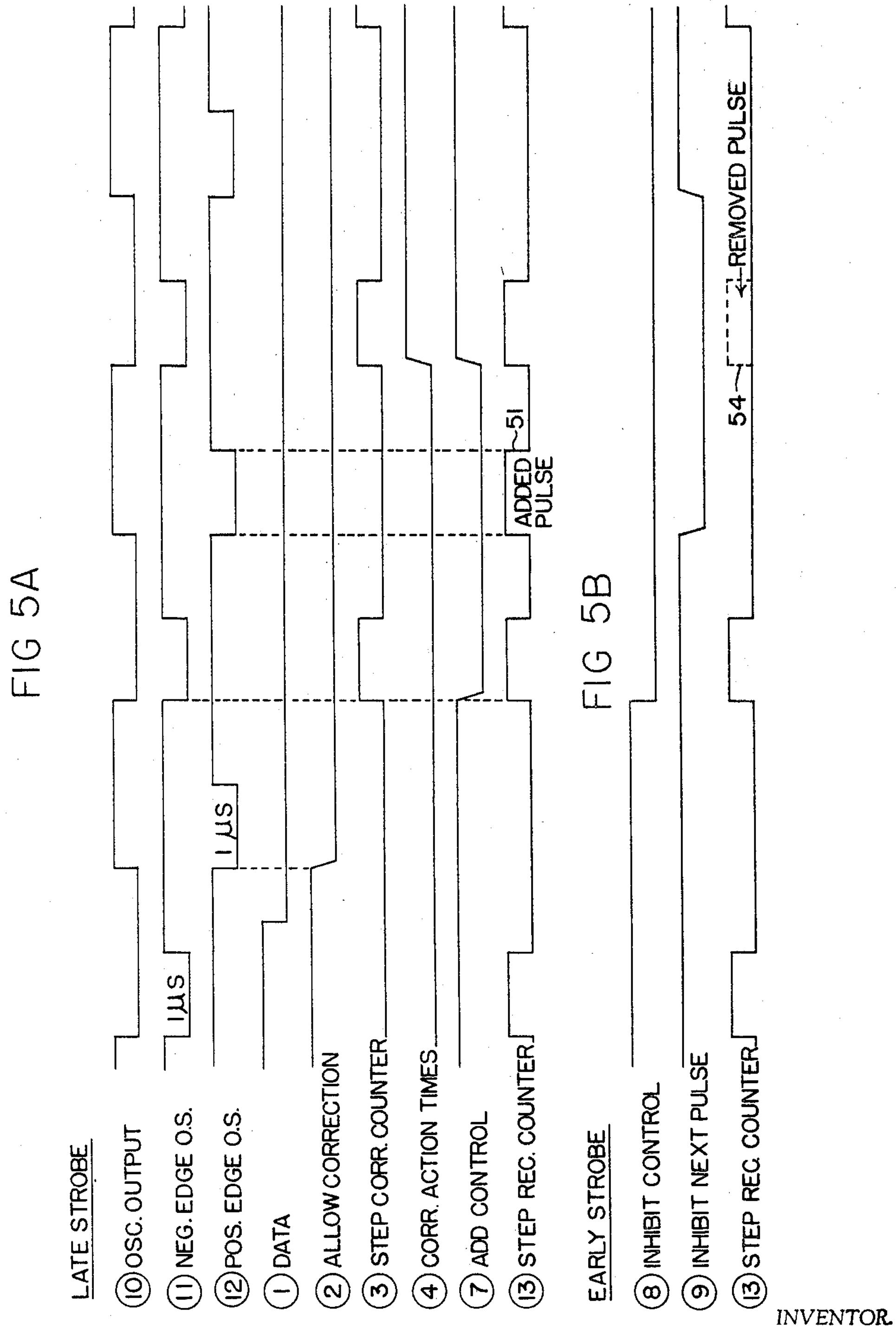
FIGS. 5A and 5B are a series of wave forms related to the time scale of the stable crystal control oscillator of FIG. 2.

Referring now to FIGS. 4 and 5A, the description of the operation of the synchronizer for a late strobe condition will be described. The data transition waveform 1 applied on line 23 generates the allow correction waveform 2 to operate the inverter 30 to pass pulses 3 to the correction counter 34 which are decoded by decoder 35, to provide the plurality of spaced correction action times of waveform 4. The crystal oscillator 21 is generating square wave 10; and from the transitions thereof, the two pulse trains 11 and 12 are applied to the step receive counter inverter 36 under control of waveforms 7 and 9. To the waveform 11 are added the particular pulses of waveform 12 which occur during add control wave 7 to produce wave 13. As indicated in FIG. 5A, waveform 13 includes added pulse 51 which advances the counter 37 and thus advances the generation of the strobe wave 6 on line 26 to be more nearly correct with respect to the center of the bit interval.

As indicated by wave 7 of FIG. 4, initially five add control gates are provided so that in each bit interval five added pulses 51 are added to wave 13 to produce the correction in the position of the strobe wave 6. As soon as the correction control signal 5 brackets one of the correction action times of wave 4, as indicated at 52 on wave 5, one of the add control gates of wave 7 is deleted; and, accordingly, for that bit interval, only four added pulses appear on wave 13 and the assertion of wave 9 deletes one pulse. The action which deletes the pulse is the same as described hereinafter with respect to FIG. 5B for the condition of an early strobe. The net correction is thus plus three pulses. Similarly, for the correction control signal pulse 53 which brackets two correction action times of wave 4, the add control gates are reduced to three and the corresponding pulses added to wave 13 for that bit interval are reduced to three with two deleted. As indicated on the data signal, wave 1, when no data transition occurs between bit intervals, no correction occurs, and the data strobe remains fixed relative to its position as a result of the previous transition.

By observing the action of waveforms 5, 6, and 7, it is apparent that the position of the data strobe wave 6 is moving to the left in FIG. 4 relative to the data signal wave 1 and, thus, is approaching a position midway between transition times, i.e., in the middle of the bit interval. This correction trend will continue until the net number of pulses added to or deleted from waveform 13 is one pulse. Note that upon the generation of the inhibit control wave 8, its duration coincides with the allowed correction wave 2; and, hence, the mere fact that the correction control signal 5 reaches the count 127 and reverts to its ZERO state does not prevent the removal of pulses at all subsequent action times for this bit interval.

Overshoot in the correction of the systems is avoided because prior to reaching the condition where pulses at all action times would be removed, the cumulative effect of the corrections on the data strobe wave 6 will be such as to move it from being the late strobe assumed in the previous description to a position where it occurs with two pulses added and three removed, thereby reversing the direction in which the correction is made.

The action for removing pulses can be seen by considering FIG. 5B which also represents the conditions that obtain for any early strobe. Whenever the inhibit control wave 8 is asserted, as indicated in FIG. 5B, the inhibit next pulse waveform 9 is generated, and this inhibiting action brackets the next regular pulse of waveform 11 which is in the normal counting sequence for the step receive counter 37. Accordingly, pulse 54 of waveform 13 in FIG. 5B is deleted from the count of the receiver counter 37, with the result that the early strobe which produced this pulse deletion is moved to the right. For normal operation, the data strobe will generally be centered at the bit interval of the data signal 1 when two pulses are added and three are removed for each data interval or vice versa, i.e., three pulses are added and two removed. The relation between strobe phase error and the net number of pulse corrections is shown in the following table for the particular parameters of the disclosed system.

| Net Change | Percent Correction | Strobe Phase Error | Strobe Count Error |
|---|---|---|---|
| 5 pulses | 4 | Above 25% | 32 of 128. |
| 3 pulses | 2.3 | 12–25% | 16–32 of 128. |
| 1 pulse | 0.8 | Under 12% | Less than 16. |

It should be noted that if the receive counter count is between 98 and 127 at a data transition time, the correction control signal will negate during the allow correction signal. Inhibit control wave 8 prevents the correction from changing to additive, however, and subtracts all five counts for this condition, thereby rapidly establishing normal proportional control.

Referring to FIGURE 1, the foregoing action will cause the slope $C_{B1}'-C_{B2}'$ to be vertical, which is the desired feature for the following consideration. Due to the change in the control signal following the count of 127, without this feature, a data transition falling in the area 98–127 would cause the sync system to correct a net of one or three pulses only, and thereby the data strobe would have a tendency to hang at a point 50% out of phase. With this feature, however, the system receives a full 5-pulse (4%) correction that is effective to correctly position the data strobe.

Figure 6:
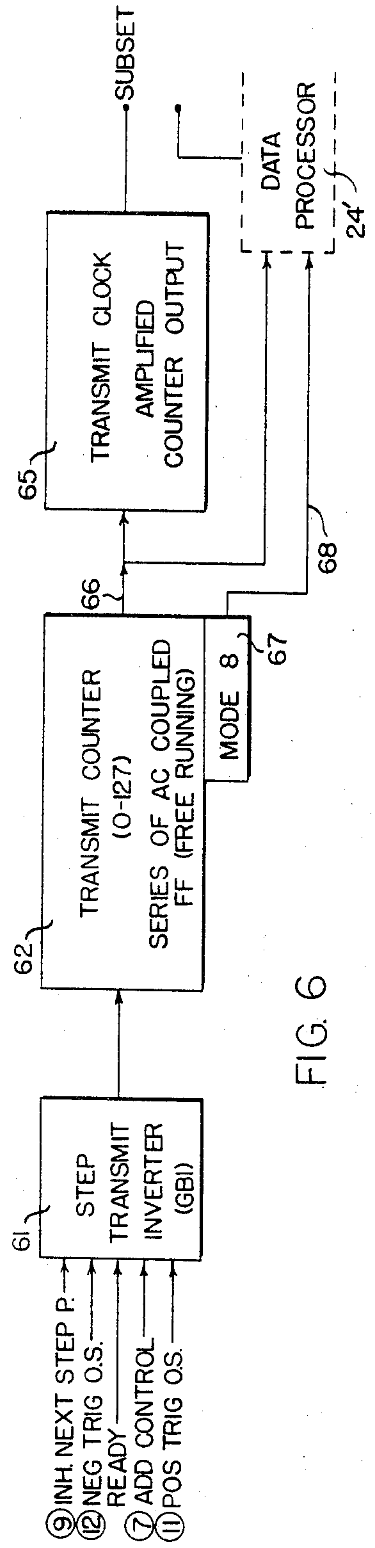
FIG. 6 is a block diagram of the transmit mode equipment at a receiving station.

Referring now to FIG. 6, the transmit apparatus for a receiver station will be described, comprising generally a step transmit inverter 61, a transmit counter 62, and a transmit clock 65. The step transmit inverter 61 produces an output waveform 13 corresponding to that generated by the step receiver inverter 36, thereby sending the answer message with the synchronizing corrections inserted therein, so that any drift occurring at the remote transmitter will have already been compensated in the message which is returned to that station. The step transmit inverter 61 receives the input waves $\bar{9}$, 12, 11, and 7, as well as a Ready signal which is generated whenever the unit is to be used as a receiver and transmits reply messages, has acquired character sync, and the circuit of the FIG. 3 has achieved bit synchronization within 12% of perfect synchronization. Under these conditions the strobe for the transmitting clock 65 is produced on lead 66, and this signal is also supplied to the other portions of the data processor 24' to be used as needed. In addition, the data processor 24' can be supplied with a character bit counter 67. For example, in a four out of eight code a mode 8 counter will produce an output on line 68 for the start of each character and supplies on lead 68 to the data processor 24' information for the maintenance of character phase for those systems which require phase reference to previous transmissions. Thus the receiver station represented by FIGS. 3 and 6 can be connected to be compatible with remote transmitters by suitable code conversion and by supplying the remote transmitter with the character phase it may require.

Although a particular embodiment of the invention has been described for purposes of illustration of the principles involved, it will be apparent that many modifications can be made without departing from the teaching of the invention. Accordingly, the invention is to be limited only by the scope of the appended claims.

We claim:

1. A digital synchronizer for received binary signals having a bit interval determined by regular nominal transition times at an established binary signal frequency comprising:
(a) a local oscillator having a stable frequency that is a high multiple of said binary signal frequency;
(b) means for generating an allowable correction interval for each binary transition of said signals;
(c) means for gating pulses of said stable frequency during said correction interval;
(d) means for selecting a plurality of spaced pulses from the gated pulses of said stable frequency;
(e) means for generating first and second pulse trains from the respective positive and negative transitions of said stable oscillator;
(f) means responsive to counting said first pulse train for producing a data strobe pulse in each bit interval of said binary signal;
(g) means for developing from the count of said first pulse train a control signal corresponding to a predetermined number of counts prior to said data strobe pulse;
(h) means responsive to said control signal for introducing a number of pulses of said second pulse train into the count of said first pulse train to the extent that pulses of said second pulse train occur prior to said control signal and with said spaced pulses; and
(i) means responsive to said control signal for deleting the counts of said first pulse train subsequent to any pulses of said second pulse train which occur within said control signal and with said spaced pulses.

2. A digital synchronizer for received binary signals having a bit interval determined by regular nominal transition times at an established binary signal frequency comprising:
(a) a local oscillator having a stable frequency that is a high multiple of said binary signal frequency;
(b) means for generating an allowable correction interval for each binary transition of said signals;
(c) means for gating pulses of said stable frequency during the correction interval;
(d) means for selecting a plurality of spaced pulses from the gated pulses of said stable frequency;
(e) means for generating first and second pulse trains from the respective positive and negative transitions of said stable oscillator;
(f) means responsive to counting said first pulse train for producing a data strobe pulse in each bit interval of said binary signal;
(g) means for developing from the count of said first pulse train a control signal corresponding to a predetermined number of counts prior to said data strobe pulse;
(h) means responsive to said control signal for introducing a number of pulses of said second pulse train into the count of said first pulse train to the extent that pulses of said second pulse train occur prior to said control signal and with said spaced pulses; and
(i) means responsive to said control signal for deleting the counts of said first pulse train subsequent to any pulses of said second pulse train which occur within said allowable correction interval and with said spaced pulses.

3. A digital synchronizer for received binary signals having a bit interval determined by regular nominal transition times at an established binary signal frequency comprising:

(a) a local oscillator having a stable frequency that is a high multiple of said binary signal frequency;
(b) means for generating an allowable correction interval equal to half said bit interval for each binary transition of said signals;
(c) means for gating pulses of said stable frequency during said correction interval;
(d) means for selecting a plurality of spaced pulses from the gated pulses of said stable frequency;
(e) means for generating first and second pulse trains from the respective positive and negative transitions of said stable oscillator;
(f) means responsive to counting said first pulse train for producing a data strobe pulse in each bit interval of said binary signal;
(g) means for developing from the count of said first pulse train a control signal corresponding to a predetermined number of counts prior to said data strobe pulse;
(h) means responsive to said control signal for introducing a number of pulses of said second pulse train into the count of said first pulse train to the extent that pulses of said second pulse train occur prior to said control signal and with said spaced pulses; and
(i) means responsive to said control signal for deleting the counts of said first pulse train subsequent to any pulses of said second pulse train which occur within said allowable correction interval and with said spaced pulses.

4. A digital synchronizer for received binary signals having a bit interval determined by regular nominal transition times at an established binary signal frequency comprising:
(a) a local oscillator having a stable frequency that is a high multiple of said binary signal frequency;
(b) means for counting said stable frequency to generate an allowable correction interval equal to half said bit interval for each binary transition of said signals;
(c) means for gating pulses of said stable frequency during said correction interval;
(d) means for selecting a plurality of spaced pulses from the gated pulses of said stable frequency;
(e) means for generating first and second pulse trains from the respective positive and negative transitions of said stable oscillator;
(f) means responsive to counting said first pulse train for producing a data strobe pulse in each bit interval of said binary signal;
(g) means for developing from the count of said first pulse train a control signal corresponding to a count of $$C_n=C_o+\frac{1+\alpha}{2}C_s$$

where:

$C_n$=a recurrent position in time where correction in receive counter is changed from plus to minus and is expressed as the count in the receive counter at this time;

$C_o$=a recurrent position in time that is coincident with data transition time when the sync system is synchronized to the data and is expressed by the count in the receive counter corresponding to this time;

$C_s$=the duration of the allow correction signal and is expressed by the number of negative trigger one-shot pulses within the allow correction signal; and $\alpha$=ratio of the time between negative trigger one-shot pulses to the time between correction action times.

(h) means responsive to said control signal for introducing a number of pulses of said second pulse train into the count of said first pulse train to the extent that pulses of said second pulse train occur prior to said control signal and with said spaced pulses; and (i) means responsive to said control signal for deleting the counts of said first pulse train subsequent to any pulses of said second pulse train which occur within said control signal and with said spaced pulses.

5. A digital synchronizer for received binary signals having a bit interval determined by regular nominal transition times at an established binary signal frequency comprising:

(a) a local oscillator having a stable frequency that is a high multiple of said binary signal frequency;

(b) means for counting said stable frequency to generate an allowable correction interval equal to half said bit interval for each binary transition of said signals;

(c) means for gating pulses of said stable frequency during said correction interval;

(d) means for selecting a plurality of spaced pulses from the gated pulses of said stable frequency;

(e) means for generating first and second pulse trains from the respective positive and negative transitions of said stable oscillator;

(f) means responsive to counting said first pulse train for producing a data strobe pulse in each bit interval of said binary signal;

(g) means for developing from the count of said first pulse train a control signal corresponding to a count of $$C_n=C_o+\frac{1+\alpha}{2}C_s$$

where:

$C_n$=a recurrent position in time where correction in receive counter is changed from plus to minus and is expressed as the count in the receive counter at this time;

$C_o$=a recurrent position in time that is coincident with data transition time when the sync system is synchronized to the data and is expressed by the count in the receive counter corresponding to this time;

$C_s$=the duration of the allow correction signal and is expressed by the number of negative trigger one-shot pulses within the allow correction signal; and $\alpha$=ratio of the time between negative trigger one-shot pulses to the time between correction action times.

(h) means responsive to said control signal for introducing a number of pulses of said second pulse train into the count of said first pulse train to the extent that pulses of said second pulse train occur prior to said control signal and with said spaced pulses; and (i) means responsive to said control signal for deleting the counts of said first pulse train subsequent to any pulses of said second pulse train which occur within said allowable correction interval and with said spaced pulses.

6. A digital synchronizer for binary data signals comprising:

a counter for counting a predetermined number of pulses of a stable frequency to obtain a data strobe pulse for each binary data bit interval;

means responsive to each transition of said data signals for generating a set of possible correction times which occupy a portion of the nominal data bit interval after each said transition;

means for generating a control wave representing separation of said predetermined number of pulses into two unequal parts;

means responsive to said control wave and said possible correction times for adding extra counts to the count in said counter for correction times during the first part of said control wave and deleting counts from the count in said counter for correction times during the second part of said control wave; and means for preventing additive pulse counts after any deleted pulses have occurred for any data transition thereby providing a net pulse change in the pulses applied to said counter during each bit interval after a data transition equal to the difference between the added and deleted pulses and proportional to the time error of said data strobe pulse relative to the center of said data bit interval.

7. Apparatus according to claim 6 and including means responsive to the first transition of a binary data message for presetting said counter to a count of half the count on said counter at which said data strobe occurs.

8. Apparatus according to claim 6 and including means for transmitting reply messages phased in accordance with said data strobe pulse.

9. Apparatus according to claim 8 and including means for referencing code character transmissions to previously transmitted characters.

References Cited

UNITED STATES PATENTS 3,185,963 5/1965 Peterson et al. -- 178—69.5 XR

ROBERT L. GRIFFIN, *Primary Examiner.*

R. L. RICHARDSON, *Assistant Examiner.*